US006657360B2

(12) United States Patent
Jerman et al.

(10) Patent No.: US 6,657,360 B2
(45) Date of Patent: Dec. 2, 2003

(54) MICROMECHANICAL DEVICE

(75) Inventors: John H. Jerman, Palo Alto, CA (US); John D. Grade, Mountain View, CA (US)

(73) Assignee: Iolon, Inc., San Jose, CA (US)

( * ) Notice: Subject to any disclaimer, the term of this patent is extended or adjusted under 35 U.S.C. 154(b) by 0 days.

(21) Appl. No.: 09/911,548

(22) Filed: Jul. 24, 2001

(65) Prior Publication Data

US 2001/0043023 A1 Nov. 22, 2001

Related U.S. Application Data (63) Continuation of application No. 09/464,361, filed on Dec. 15, 1999.
(60) Provisional application No. 60/112,265, filed on Dec. 15, 1998, provisional application No. 60/112,263, filed on Dec. 15, 1998, and provisional application No. 60/123,512, filed on Mar. 8, 1999.

(51) Int. Cl.[7] .............................................. H02N 1/00
(52) U.S. Cl. ...................................... 310/309; 310/308
(58) Field of Search ................................. 310/308, 309

(56) References Cited

U.S. PATENT DOCUMENTS

| 5,025,346 A | | 6/1991 | Tang et al. ................... 361/283 |
|---|---|---|---|
| 5,153,870 A | | 10/1992 | Lee et al. ...................... 369/11 |
| 5,477,097 A | * | 12/1995 | Matsumoto .................. 310/309 |
| 5,554,304 A | * | 9/1996 | Suzuki ........................... 216/2 |
| 5,780,948 A | * | 7/1998 | Lee et al. ...................... 310/81 |
| 5,801,472 A | * | 9/1998 | Wada et al. ................. 250/309 |
| 5,850,375 A | | 12/1998 | Wilde et al. ................... 369/14 |
| 5,959,376 A | * | 9/1999 | Allen .................... 310/40 MM |
| 5,982,585 A | | 11/1999 | Fan et al. .................... 360/104 |
| 5,998,906 A | | 12/1999 | Jerman et al. ............... 310/309 |
| 6,000,280 A | * | 12/1999 | Miller et al. ................... 73/105 |
| 6,134,207 A | | 10/2000 | Jerman et al. ............... 369/112 |
| 6,137,206 A | | 10/2000 | Hill ............................. 370/306 |
| 6,178,069 B1 | | 1/2001 | Suzuki .................... 360/296.5 |
| 6,198,145 B1 | * | 3/2001 | Ferrari et al. ................ 257/415 |
| 6,308,573 B1 | * | 10/2001 | Lee et al. .................... 310/309 |
| 6,349,597 B1 | * | 2/2002 | Folkmer et al. .................... 1/1 |

FOREIGN PATENT DOCUMENTS

WO        WO 98/09289 A1    5/1998

* cited by examiner

Primary Examiner—Dang Le
(74) Attorney, Agent, or Firm—Dorsey & Whitney LLP (57) ABSTRACT

A rotary electrostatic microactuator that includes a substantially planar substrate and a rotatable member overlying the substrate for rotation about an axis of rotation extending perpendicular to the planar substrate. First and second spaced-apart springs and a plurality of comb drive assemblies are included. Each of the comb drive assemblies has a first comb drive member mounted on the substrate and a second comb drive member. Each of the first and second comb drive members are provided with arcuate comb drive fingers. Each of the first and second springs has a first end portion secured to the substrate and a second end portion secured to at least one of the second comb drive members for suspending the second comb drive members and the rotatable member over the substrate. The second comb drive members are movable in a direction of travel about the axis of rotation between a first position in which the comb drive fingers of the first and second comb drive members are not substantially fully interdigitated and a second position in which the comb drive fingers of the first and second comb drive members are substantially fully interdigitated.

58 Claims, 4 Drawing Sheets

MICROMECHANICAL DEVICE

CROSS-REFERENCE TO RELATED APPLICATION

This application is a continuation application of U.S. patent application Ser. No. 09/464,361 filed Dec. 15, 1999, which claims priority to U.S. provisional patent application Ser. No. 60/112,265 filed Dec. 15, 1998, to U.S. provisional patent application Ser. No. 60/112,263 filed Dec. 15, 1998 and to U.S. provisional patent application Ser. No. 60/123,512 filed Mar. 8, 1999, the entire contents of each of which are incorporated herein by this reference.

SCOPE OF THE INVENTION

The present invention relates generally to electrostatic actuators and more particularly to rotary electrostatic microactuators with comb drive assemblies.

BACKGROUND

Many early rotating electrostatic motors used a central bearing with various arrangements of electrostatic stators around the motors to effect rotation. Unfortunately, these motors tended to have problems with friction at the central bearing and have had lifetime issues related to wear of the bearing. The motors typically acted as stepper motors where the rotor rotates with an incremental motion as the stator elements are attracted. Thus it was difficult to precisely adjust a plate to a particular angle with such motors.

Other angular motors have been described which use flexural elements to support a rotating element. Comb drive fingers are arranged in concentric arcs around a central flexural pivot, so that small angular motion is provided around the pivot. See, for example, D. A. Horsley, et al., "Angular Micropositioner for Disk Drives", Proceedings of the Tenth International Workshop on Micro Electro Mechanical Systems, 1997, pp 454–458; L.-S. Fan, et al., "Batch-Fabricated Area-Efficient Milli-Actuators", Proceedings 1994 Solid State Sensor and Actuator Workshop, Hilton Head, pp 38–42; T. Juneau, et al., "Dual Axis Operation of a Micromachined Rate Gyroscope", Proceedings 1997 International Conference on Solid State Sensors and Actuators, V.2, pp 883–890; E. H. Klaassen, et al., "Silicon Fusion Bonding and Deep Reactive Ion Etching; A New Technology for Microstructures", The 8th International Conference on Solid-State Sensors and Actuators, and Eurosensors IX, Stockholm, Sweden, Jun. 25–29, 1995, pp 556–559; W. C. Tang, et al., "Laterally Driven Polysilicon Resonant Microstructures", Sensors Actuators 20, 1989, pp 25–31 (IEEE reprint pp. 53–59) and U.S. Pat. No. 5,025,346 to Tang et al. Unfortunately, all of these devices provide a limited angular range of motion.

In general, it is an object of the present invention to provide a rotary electrostatic microactuator with an improved range of angular motion.

Another object of the invention is to provide a rotary electrostatic microactuator of the above character in which side instability forces in the one or more comb drive assemblies of the microactuator are minimized.

Another object of the invention is to provide a rotary electrostatic microactuator of the above character which permits rotation of a member extending out of the plane of the microactuator.

Another object of the invention is to provide a rotary electrostatic microactuator of the above character which is other than circular in shape.

Another object of the invention is to provide a rotary electrostatic microactuator of the above character in which the axis of rotation of the microactuator is disposed adjacent a side of the microactuator.

SUMMARY OF THE INVENTION

The present invention provides a rotary electrostatic microactuator that includes a substantially planar substrate and a rotatable member overlying the substrate for rotation about an axis of rotation extending perpendicular to the planar substrate. First and second spaced-apart springs and a plurality of comb drive assemblies are included. Each of the comb drive assemblies has a first comb drive member mounted on the substrate and a second comb drive member. Each of the first and second comb drive members are provided with arcuate comb drive fingers. Each of the first and second springs has a first end portion secured to the substrate and a second end portion secured to at least one of the second comb drive members for suspending the second comb drive members and the rotatable member over the substrate. The second comb drive members are movable in a direction of travel about the axis of rotation between a first position in which the comb drive fingers of the first and second comb drive members are not substantially fully interdigitated and a second position in which the comb drive fingers of the first and second comb drive members are substantially fully interdigitated. The plurality of comb drive assemblies can optionally subtend an angle of approximately 180° about the axis of rotation to form a semicircle having a base extending substantially along a diameter of the semicircle with the axis of rotation being disposed adjacent the base at the center of the semicircle. Alternatively, the microactuator can be substantially circular in shape. The first and second springs can optionally be folded. In another aspect of the invention, a push-pull rotary electrostatic microactuator is provided.

BRIEF DESCRIPTION OF THE DRAWINGS

The accompanying drawings, which are somewhat schematic in many instances and are incorporated in and form a part of this specification, illustrate several embodiments of the invention and, together with the description, serve to explain the principles of the invention.

DESCRIPTION OF THE INVENTION

Figure 1:
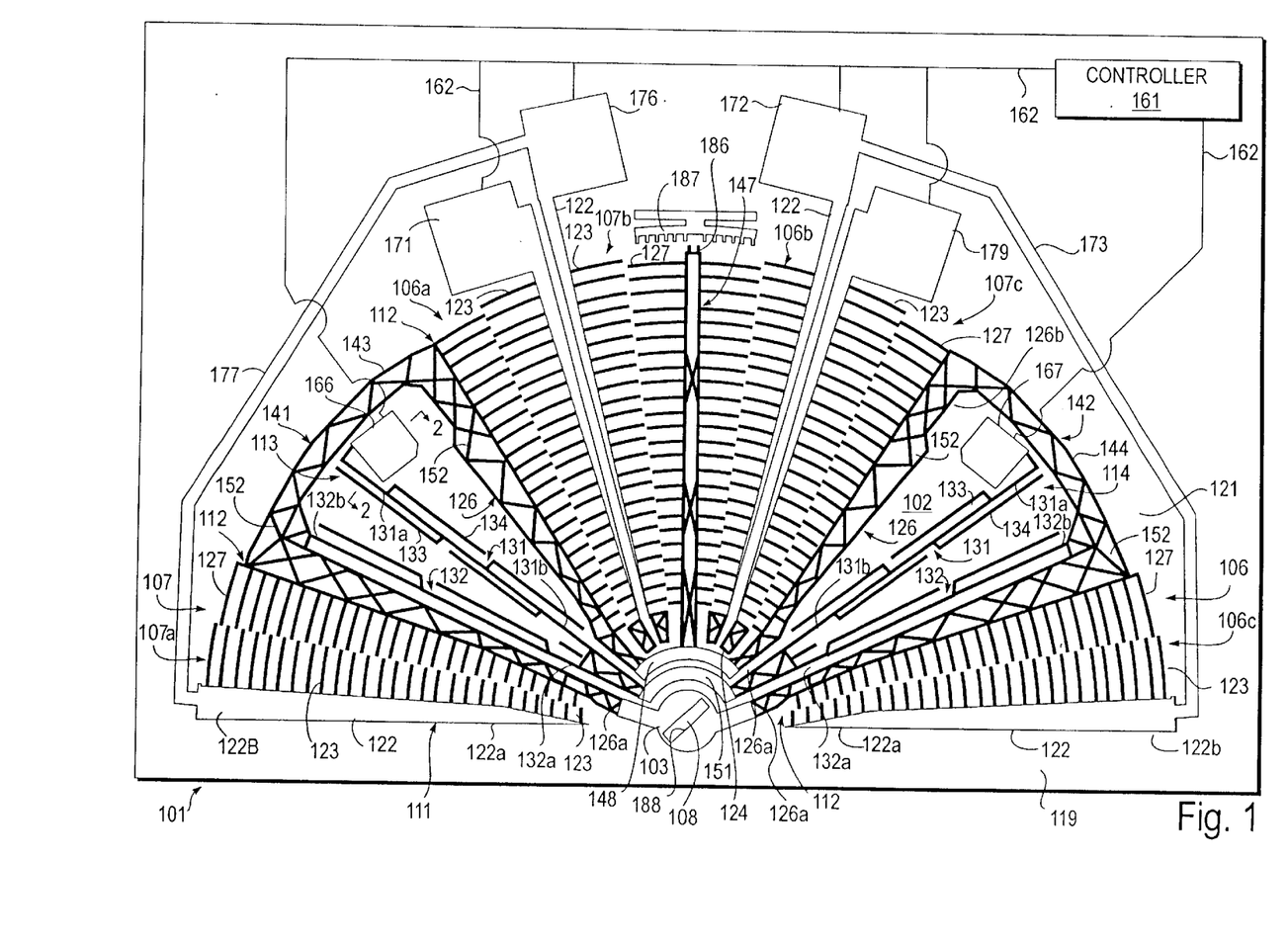
FIG. 1 is a plan view of a rotary electrostatic microactuator of the present invention.
Figure 2:
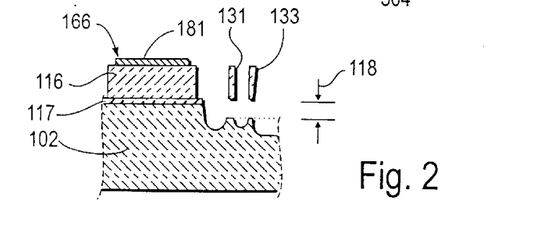
FIG. 2 is a cross-sectional view of the rotary electrostatic microactuator of FIG. 1 taken along the line 2—2 of FIG. 1.

Rotary electrostatic microactuator 101 of the present invention is formed on a planar substrate 102 (see FIGS. 1 and 2). A rotatable member or circular mirror holder 103 overlies the substrate 102. A plurality of first and second comb drive assemblies 106 and 107 are carried by substrate 102 for rotating mirror holder 103 in first and second opposite angular directions about an axis of rotation 108 extending through the center of the circular mirror holder 103 perpendicular to planar substrate 102 and thus FIG. 1. Each of the first and second comb drive assemblies 106 and 107 includes a first comb drive member or comb drive 111 mounted on substrate 102 and a second comb drive member or comb drive 112 overlying the substrate 102. First and second spaced-apart springs 113 and 114 are included in microactuator 101 for supporting or suspending second comb drives 112 and mirror holder 103 above the substrate 102 and for providing radial stiffness to the movable second comb drives 112 and thus the mirror holder 103.

Substrate 102 is made from any suitable material such as silicon and is preferably formed from a silicon wafer. The substrate has a thickness ranging from 200 to 600 microns and preferably approximately 400 microns. Mirror holder 103, first and second comb drive assemblies 106 and 107 and first and second springs 113 and 114 are formed atop the substrate 102 by a second or top layer 116 made from a wafer of any suitable material such as silicon. Top wafer 116 has a thickness ranging from 10 to 200 microns and preferably approximately 85 microns and is secured to the substrate 102 by any suitable means. The top wafer 116 is preferably fusion bonded to the substrate 102 by means of a silicon dioxide layer 117 having a thickness ranging from 0.1 to two microns and preferably approximately one micron. Top wafer 116 may be lapped and polished to the desired thickness. The mirror holder 103, the first and second comb drive assemblies 106 and 107 and the first and second springs 113 and 114 are formed from the top wafer 116 by any suitable means. Preferably, such structures are etched from wafer 116 using deep reactive ion etching (DRIE) techniques. Mirror holder 103 is spaced above substrate 102 by an air gap 118, that ranges from three to 30 microns and preferably approximately 15 microns, so as to be electrically isolated from the substrate.

At least one and preferably a plurality of first comb drive assemblies 106 are included in rotary electrostatic microactuator 101 and disposed about axis of rotation 108, shown as a point in FIG. 1, for driving mirror holder 103 in a clockwise direction about axis 108. At least one second comb drive assembly 107 and preferably a plurality of second comb drive assemblies 107 can be included in microactuator 101 for driving the mirror holder in a counterclockwise direction about the axis of rotation 108. Each of the first and second comb drive assemblies 106 and 107 extends substantially radially from axis of rotation 108 and, in the aggregate, subtend an angle of approximately 180° so as to provide rotary microactuator 101 with a semicircular or fanlike shape when viewed in plan (see FIG. 1). More specifically, microactuator 101 has three first comb drive assemblies 106a, 106b and 106c and three second comb drive assemblies 107a, 107b and 107c. Rotary microactuator 101 has a base 119 extending along a diameter of the semicircle formed by the microactuator 101 and has an outer radial extremity 121 resembling the arc of a semicircle. Radial extremity 121 has first and second ends which adjoin the first and second opposite ends of base 119. The radial extremity 121 is defined by the outer radial extremities of first and second comb drive assemblies 106 and 107. Mirror holder 103 and axis of rotation 108 are disposed at the center of the semicircle adjacent base 119.

First and second comb drive assemblies 106 and 107 are interspersed between each other, that is, a second comb drive assembly 107 is disposed between each pair of adjacent first comb drive assemblies 106. The first comb drive assemblies 106 are symmetrically disposed relative to the second comb drive assemblies 107 about the radial centerline of rotary electrostatic microactuator 101, that is the imaginary line extending in the plane of substrate 102 through axis of rotation 108 and perpendicular to base 119. Each of the first and second comb drive assemblies 106 and 107 has a length ranging from 200 to 2,000 microns and more preferably approximately 580 microns. Rotary microactuator 101 has a length measured along base 119 ranging from 500 to 5,000 microns and more preferably approximately 1,800 microns.

First comb drive 111 of each of first and second comb drive assemblies 106 and 107 is mounted to substrate 102 by means of silicon dioxide layer 117. As such, the first comb drives 111 are immovably secured to substrate 102. Each of the first comb drives 111 has a radially-extending bar 122 provided with a first or inner radial portion 122a and a second or outer radial portion 122b. Outer portion 122b extends to outer radial extremity 121 of microactuator 101. A plurality of comb drive fingers 123 are longitudinally spaced apart along the length of bar 122 at a separation distance ranging from eight to 50 microns and preferably approximately 24 microns. The comb drive fingers 123 extend substantially perpendicularly from bar 122 and are each arcuate in shape. More specifically, each comb finger 123 has a substantially constant radial dimension relative to axis of rotation 108 as it extends outwardly from the bar 122. Fingers 123 have a length ranging from approximately 22 to 102 microns and increase substantially linearly in length from bar inner portion 122a to bar outer portion 122b. Although the comb fingers 123 can vary in width along their length, the comb fingers 123 are shown as having a constant width ranging from two to 12 microns and preferably approximately six microns. Bar inner portions 122a for first comb drive assemblies 106a and 106b and second comb drive assemblies 107b and 107c are joined to a base member 124 which serves to anchor such bars 122 to substrate 102 and permit such bar inner portions 122a to have a smaller width and the related comb drives 123 to thus have a corresponding longer length.

Second comb drives 112 are spaced above substrate 102 by air gap 118 so as to be movable relative to substrate 102 and relative to first comb drives 111. The second comb drives 112 have a construction similar to the first comb drives 111 discussed above and, more specifically, are formed with a bar 126 that extends radially outwardly from axis of rotation 108. The bar 126 has a first or inner radial portion 126a in close proximity to axis 108 and a second or outer radial portion 126b that extends to radial extremity 121. A plurality of comb drive fingers 127 are longitudinally spaced apart along the length of bar 126 and are substantially similar to comb fingers 123. Arcuate comb fingers 127 are offset relative to comb fingers 123 so that the comb fingers 127 on second comb drive 112 can interdigitate with comb fingers 123 on first comb drive 111 when the second comb drives 112 are rotated about axis 108 towards the stationary first comb drives 111. Each of first and second comb drive assemblies 106 and 107 resembles a sector of the semicircular microactuator 101.

Means including first and second spaced-apart springs 113 and 114 are included within rotary electrostatic microactuator 101 for movably supporting second comb drives 112 over substrate 102. First and second suspension elements or springs 113 and 114 each have a length which preferably approximates the length of first and second comb drive assemblies 106 and 107, however springs having lengths less than the length of the comb drive assemblies can be provided. Although first and second springs 113 and 114 can each be formed from a single spring member, the springs 113 and 114 are each preferably U-shaped or V-shaped in conformation so as to be a folded spring. As shown, springs 113 and 114 are substantially U-shaped. Each of springs 113 and 114 is made from first and second elongate spring members 131 and 132. First or linear spring member 131 has first and second end portions 131a and 131b and second or linear spring member 132 has first and second end portions 132a and 132b.

The first end portion 131a of each folded spring 113 and 114 is secured at its end to substrate 102 adjacent axis of rotation 108 by means of silicon dioxide layer 117 (see FIG. 2). The balance of the spring is spaced above the substrate by air gap 118. Second end portion 131b of each spring 113 and 114 is secured to first end portion 132a of the second spring member 132. First and second beam-like spring members 131 and 132 each extend radially outwardly from axis of rotation 108 and preferably have a length approximating the length of first and second comb drive assemblies 106 and 107. The spring members 131 and 132 are preferably approximately equal in length and each have a length of approximately 500 microns. As such, spring first end portions 131a are secured to substrate 102 adjacent spring second end portions 132b. Although first end portion 131a of each spring 113 and 114 can be secured to substrate 102 adjacent mirror holder 103 or adjacent outer radial extremity 121, the first end portion 131a is preferably secured to substrate 102 adjacent outer radial extremity 121. First and second spring members 131 and 132 each have a width ranging from one to 10 microns and preferably approximately four microns. First and second thin, elongate sacrificial bars 133 and 134, of a type described in U.S. Pat. No. 5,998,906 and in copending U.S. patent application Ser. No. 09/135,236 filed Aug. 17, 1998, the entire contents of each of which are incorporated herein by this reference, extend along each side of each spring member 131 and 132 for ensuring even etching and thus the desired rectangular cross section of the spring members. Sacrificial bars 133 and 134 are disposed along opposite sides of the spring members and extend parallel to the respective spring member.

Second end portion 132b of each spring 113 and 114 is secured to at least one of second comb drives 112. In this regard, first and second movable frame members or frames 141 and 142, spaced above substrate 102 by air gap 118, are provided in rotary electrostatic microactuator 101. Each of the frames 141 an 142 is substantially U-shaped in conformation and includes as side members bars 126 of the adjoining second comb drives 112. More specifically, first movable frame 141 includes bar 126 of second comb drive assembly 107a, bar 126 of first comb drive assembly 106a and an arcuate member 143 which interconnects such bar outer portions 126b. Second movable frame 142 is similar in construction and includes as side members bar 126 of second comb drive assembly 107c, bar 126 of first comb drive assembly 106c and an arcuate member 144 which interconnects such bar outer portions 126b. Second end portion 132b of first spring 113 is secured to arcuate member 143 adjacent to bar outer portion 126b of second comb drive assembly 107a, while the second end portion 132b of second spring 114 is secured to arcuate member 144 adjacent bar outer portion 126b of first comb drive assembly 106c. In this manner, first folded spring 113 is disposed inside first movable frame 142 and second folded spring 114 is disposed inside second movable frame 142. Bar inner portion 126a of second comb drive assembly 107a is joined to mirror holder 103 and serves to secure first spring 113 to the mirror holder. Similarly, bar inner portion 126a of first comb drive assembly 106c is joined to mirror holder 103 for interconnecting second spring 114 to the mirror holder.

First and second movable frames 141 and 142 are symmetrically disposed about the radial centerline of rotary electrostatic microactuator 101. At least one comb drive assembly and preferably at least one first comb drive assembly 106 and at least one second comb drive assembly 107 are disposed between first and second movable frames 141 and 142 and thus first and second springs 113 and 114. More specifically, first comb drive assemblies 106a and 106b and second comb drive assemblies 107b and 107c are disposed between frames 141 and 142. Bar 126 of second comb drive assembly 107b and bar 126 of first comb drive assembly 106b are joined back to back to form a third movable frame 147 preferably extending along the centerline of microactuator 101 between movable frames 141 and 142. An inner arcuate member or shuttle 148 is joined at opposite ends to first and second movable frames 141 and 142. One end of rigid shuttle 148 is secured to bar inner portion 126a of first comb drive assembly 106a while the second end of the shuttle 148 is secured to bar inner portion 126a of second comb drive assembly 107c. Third movable frame 147 is joined to the middle of the shuttle 148 so as to rotate in unison with first and second movable frames 141 and 142 about axis 108. An additional arcuate member 151 is provided in microactuator 101 for rigidly securing together second end portions 131b of first and second springs 113 and 114. The arcuate member 151 overlies substrate 102 and extends at least partially around the axis of rotation 108. Member 151 is disposed between shuttle 148 and mirror holder 103 and rotates about axis 108 free of mirror holder 103. The suspended structures of microactuator 101, that is mirror holder 103, second comb drives 112, first and second springs 131 and 132 and first and second movable frames 141 and 142, each have a thickness ranging from 10 to 200 microns and preferably approximately 85 microns.

Second comb drives 112 of first and second comb drive assemblies 106 and 107 are movable in a direction of travel about axis of rotation 108 by means of movable frames 141, 142 and 147 between respective first positions, as shown in FIG. 1, in which comb drive fingers 123 and 127 of the first and second comb drives are not substantially fully interdigitated and respective second positions, not shown, in which the comb drive fingers 123 and 127 are substantially fully interdigitated. Although comb drive fingers 123 and 127 can be partially interdigitated when second comb drives 112 are in their first positions, the comb fingers 123 and 127 are shown as being fully disengaged and thus are not interdigitated when second comb drives 112 are in their first positions. When in their second positions, comb fingers 127 of second comb drives 112 extend between respective comb drive fingers 123 of the first comb drives 111. Comb fingers 127 approach but preferably do not engage bar 122 of the respective first comb drives 111 and similarly comb drive fingers 123 approach but preferably do not engage bar 126 of the respective second comb drives 112. Rigid movable frames 141, 142 and 147 are constructed as light weight members to decrease the mass and moment of inertia of the movable portions of microactuator 101 and thus facilitate rotation of second comb drives 112 and mirror holder 103 about axis of rotation 108. Each of the movable frames 141, 142 and 147 is substantially hollow and formed with a plurality of internal beams or trusses 152 for providing rigidity to the movable frame.

Electrical means is included within microactuator 101 for driving second comb drives 112 between their first and second positions. Such electrical means includes a controller and voltage generator 161 that is electrically connected to a plurality of electrodes provided on substrate 102 by means of a plurality of electrical leads 162. Controller 161 is shown schematically in FIG. 1. A first ground electrode 166 and a second ground electrode 167 are formed on substrate 102 and are respectively joined to the first end portion 131a of first and second springs 113 and 114 for electrically grounding second comb drives 112 and mirror holder 103. Electrodes 166 and 167 serve as the attachment points for spring first end portions 131a to the substrate 102. First comb drives 111 of first comb drive assemblies 106 can be supplied a voltage potential from controller 161 by means of an electrode 171 electrically coupled to bar outer portion 122b of first comb drive assembly 106a and an additional electrode 172 electrically coupled to the first comb drive 111 of first comb drive assembly 106b and to first comb drive 111 of first comb drive assembly 106c by lead 173. An electrode 176 is secured to the first comb drive 111 of second comb drive assembly 107a by means of lead 177 and to second comb drive assembly 107b and an electrode 179 is joined to bar outer portion 122b of second comb drive assembly 107c for providing a voltage potential to the first comb drives of second comb drive assemblies 107. A metal layer 181 made from aluminum or any other suitable material is created on the top surface of top wafer 116 for creating electrodes 166, 167, 171, 172, 176 and 179 and for creating leads 173, 174, 177 and 178 (see FIG. 2). First and second pointers 186 extend radially outwardly from the outer end of third movable frame 147 for indicating the angular position of mirror holder 103 about axis 108 on a scale 187 provided on substrate 102.

Means in the form of a closed loop servo control can be included in microactuator 101 for monitoring the position of second comb drives 112 and thus mirror holder 103. For example, controller 161 can determine the position of the movable comb drives 112 by means of a conventional algorithm included in the controller for measuring the capacitance between comb drive fingers 127 of the movable comb drives 112 and the comb drive fingers 123 of the stationary comb drives 111. A signal separate from the drive signal to the comb drive members can be transmitted by controller 161 to the microactuator for measuring such capacitance. Such a method does not require physical contact between the comb drive fingers. Alternatively, where microactuator 101 is used in an optical system, a portion of the output optical energy coupled into the output fiber can be diverted and measured and the drive signal from the controller 161 to the microactuator 101 adjusted until the measured optical energy is maximized.

In an exemplary operation of rotary electrostatic microactuator 101, a micromirror (not shown) can be mounted to mirror holder 103 out of the plane of the microactuator, for example by means of insertion into slot 188 provided in the mirror holder 103, for rotation about axis of rotation 108. The mirror has a reflective face (not shown) which extends perpendicularly from plane of substrate 102 and can serve as part of an optical switch for deflecting a laser beam. An optical switch utilizing a microactuator 101 having such a mirror is particularly suited for use in a fiber-optic network of a telecommunications system.

Mirror holder 103 can be rotated in opposite first and second directions of travel about axis of rotation 108 by means of controller 161. When it is desired to rotate the mirror holder 103 in a clockwise direction about axis 108, a voltage potential is supplied by the controller to first comb drives 111 of first comb drive assemblies 106 so as to cause comb fingers 127 of the second comb drives 112 of first comb drive assemblies 106 to be electrostatically attracted to comb fingers 123 of such first comb drives 111. Such attraction force causes comb drive fingers 127 to move towards and interdigitate with comb fingers 123. The amount of such interdigitation, and thus the amount of rotation of mirror holder 103 about axis 108, can be controlled by the amount of voltage supplied to first comb drives 111 of first comb drive assemblies 106. When and if it is desired to rotate mirror holder 103 in a counterclockwise direction about axis 108, a suitable voltage potential can be supplied to first comb drives 111 of second comb drive assemblies 107 to cause comb drive fingers 127 of the respective second comb drives 112 to move towards and interdigitate with comb drive fingers 123 of the second comb drive assemblies 107. As can be seen, the second comb drive members 112 of one of first comb drive assemblies 106 or second comb drive assemblies 107 are in their second positions when second comb drive members 112 of the other of second comb drive assemblies 107 or first comb drive assemblies 106 are in their first positions.

Suitable voltage potentials to drive comb drive assemblies 106 and 107 can range from 20 to 200 volts and preferably range from 60 to 150 volts. Microactuator 101 is capable of +/−six degrees angular rotation, that is a rotation of six degrees in both the clockwise and counterclockwise directions for an aggregate rotation of twelve degrees, when drive voltages of 120 volts are utilized. The amount of angular deflection is dependent on the number of comb fingers 123 and 127, the gap between the comb fingers and the length and width of the first and second folded springs 113 and 114.

The use of radially-extending springs 113 and 114 within electrostatic microactuator 101 enhances the stability of the microactuator and thus facilitates relatively large angular rotation of mirror holder 103. Springs 113 and 114 provide a radial stiffness to microactuator 101 which limits sidewise movement of comb fingers 127 as they interdigitate with comb fingers 123. Such radial stiffness thus inhibits any sidewise snap over which may otherwise occur between comb fingers 123 an 127.

The folded nature of springs 113 and 114 further enhances the radial stiffness of microactuator 101. In this regard, folded springs 113 and 114 are each able to contract radially in response to rotation of second comb drives 112 and thus inhibit the formation of axial tension in the springs. More specifically, radial contraction due to bending of one spring member 131 or 132 during rotation, which can alone cause misalignment of the interdigitating comb drive fingers 123 and 127, is compensated by the radial contraction of the other spring member. Such compensation is permitted by the symmetrical design of each of the springs 113 and 114; spring members 131 and 132 are approximately equal in length and spring member 131 is attached to substrate 102 at approximately the same radial distance that spring member 132 is attached to the respective movable frame 141 or 142.

The joinder of spring second end portions 131b by arcuate member 151, which by symmetry rotates angularly about axis 108 at half the angular rotation of mirror holder 103, further enhances the radial stiffness of microactuator 101 by constraining rotation of the folded inner radial portion of springs 113 and 114 as comb drives 112 rotate about axis of rotation 108. As discussed above, first comb drive assemblies 106a and 106b and second comb drive assemblies 107b and 107c are disposed between first and second movable frames 141 and 142. Arcuate 151 particularly contributes to the radial stiffness of the second comb drives 112 of these comb drive assemblies.

First and second springs 113 and 114 are advantageously secured to substrate 102 at outer radial extremity 121 and thus away from axis of rotation 108. The relatively large electrodes 166 and 167 which additionally serve to connect the springs to the substrate are more easily accommodated at extremity 121 than close to axis 108. In additional, comb drive bars 126 can further serve to connect the ends of springs 113 and 114 to mirror holder 103.

The symmetrical disposition of springs 113 and 114 relative to the centerline of microactuator 101 and the angular separation of the springs a distance of ranging from 30° to 150° and as shown approximately 90° serve to constrain microactuator 101 so that externally imposed linear accelerations do not substantially affect the angular deflection of the optical components. More specifically, each spring 113 and 114 opposes linear accelerations along its respective axis and provides the required radial stiffness to resist the tendency of comb drive assemblies 106 and 107 to snap over in any radial direction.

The thickness of the movable structures of microactuator 101 affects the stiffness to off axis modes. Thus, a high aspect ratio device is preferred and the movable structures have a thickness substantially greater than the width of the smallest features of microactuator 101. In this manner, out-of-plane stiffness of the structures is relatively great, substantially constraining motion to that in the plane of the microactuator 101.

First and second folded springs 113 and 114 permit relatively large rotational travel of mirror holder 103 about rotation axis 108. First and second spring members 131 and 132 bend towards each other during clockwise rotation of mirror holder 103 about axis 108 and bend away from each other during counterclockwise rotation of the mirror holder 103. First and second movable frames 141 and 142 are sufficiently sized and provided with sufficient internal space to accommodate the deflection of first and second springs 113 and 114 therein. The utilization of two bendable spring members 131 and 132 joined together to create a folded spring increases the amount of permitted rotational travel relative to a microactuator having one or more springs having a radial length approximating the radial length of folded springs 113 and 114 but formed from only a single such spring member, that is one or more nonfolded springs.

The semi-circular or fanlike shape of rotary electrostatic microactuator 101 permits axis of rotation 108, and for example the mirror carried thereby, to be placed close to a GRIN lens or other component of the fiber-optic system.

Although microactuator 101 has been disclosed for use in a fiber-optic network of a telecommunications system, it should be appreciated that the microactuator 101, for use with or without a mirror, has other applications. For example, microactuator 101 can be used in an optical switch or other component of an optical data storage system of the type described in copending U.S. patent application Ser. No. 09/135,236 filed Aug. 17, 1998, in optical scanners, optical spectrometers, optical phase compensators or in other structures for rotating components such as optical waveplates, mirrors or diffraction gratings.

Other fan-shaped electrostatic microactuators having comb drive fingers which interdigitate in an angular direction of travel about an axis of rotation can be provided. Rotary electrostatic microactuator 201, shown in FIG. 3, has similarities to microactuator 101 and like reference numerals have been used to describe like components of microactuators 101 and 201. A rotatable member or mirror holder 202 overlies substrate 102. A plurality of first and second comb drive assemblies 203 and 204 are carried by the substrate 102 for rotating the mirror holder 202 in first and second opposite direction about an axis of rotation 206 extending perpendicular to planar substrate 102. The axis of rotation is shown as a point in FIG. 3 and labeled by reference line 206. Each of the first and second comb drive assemblies 203 and 204 includes a first drive member or comb drive 211 mounted on substrate 102 and a second comb drive member or comb drive 212 overlying the substrate. First and second spaced-apart springs 213 and 214 are included in microactuator 201 for supporting or suspending second comb drives 212 and mirror holder 202 above the substrate 102 and for providing radial stiffness to the second comb drives 212 and the mirror holder 202. The mirror holder 202, first and second comb drive assemblies 203 and 204 and first and second springs 213 and 214 are formed from top layer 116 by any suitable means such as discussed above for microactuator 101. Mirror holder 202, second comb drives 212 and first and second springs 213 and 214 are spaced above substrate 102 by air gap 188 and have thicknesses similar to those discussed above for the like components of microactuator 101.

Figure 3:
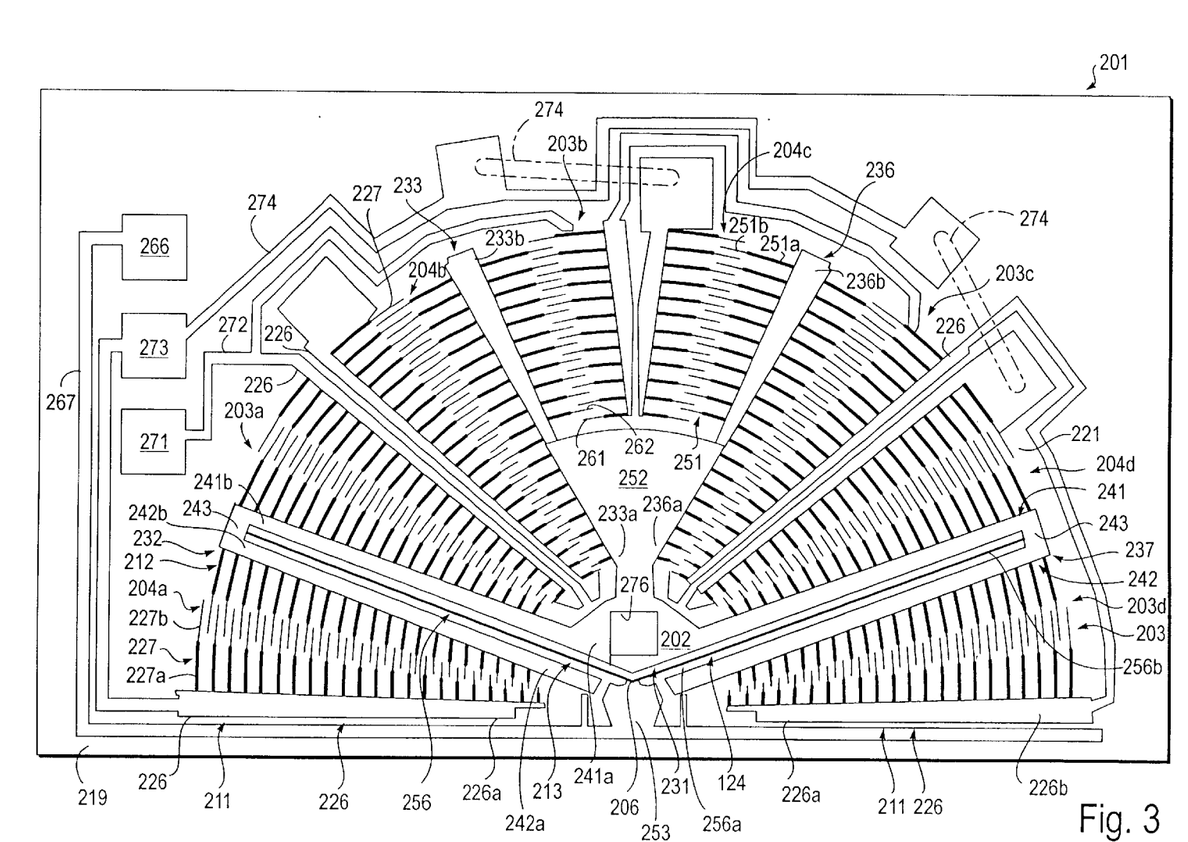
FIG. 3 is a plan view of another embodiment of the rotary electrostatic microactuator of the present invention.

At least one and preferably a plurality of first comb drive assemblies 203 are included in rotary electrostatic microactuator 201 and disposed about axis of rotation 206 for driving mirror holder 202 in a clockwise direction about axis of rotation 206. At least one and preferably a plurality of second comb drive assemblies 204 can be included in microactuator 201 for driving the mirror holder in a counterclockwise direction about the axis of rotation 206. Each of the first and second comb drive assemblies 203 and 204 extends substantially radially from axis of rotation 108 and the assemblies 203 and 204, in the aggregate, subtend and angle of approximately 180° to provide the semicircular or fanlike shape to microactuator 201. More particularly, microactuator 201 has four first comb drive assemblies 203a, 203b, 203c and 203d and four second comb drive assemblies 204a, 204b, 204c and 204d. The first comb drive assemblies 203 are interspersed between the second comb drive assemblies 204. The rotary microactuator 201 has a base 219 substantially similar to base 119 and an outer radial extremity 221 substantially similar to outer radial extremity 121. First comb drive assemblies 203 are symmetrically disposed relative to second comb drive assemblies 204 about the radial centerline of rotary electrostatic microactuator 201, that is the imaginary line extending in the plane of substrate 102 through axis of rotation 206 perpendicular to base 219. Mirror holder 202 and axis of rotation 206 are disposed at the center of microactuator 201 adjacent base 219. The rotary microactuator has a length measured along base 219 ranging from 500 to 5,000 microns and preferably approximately 2,000 microns.

First comb drive 211 of each of first and second comb drive assemblies 203 and 204 is mounted to substrate 101 in the manner discussed above with respect to first comb drives 111. Each of the first comb drives 211 has a radial-extending bar 226 provided with a first or inner radial portion 226a and a second or outer radial portion 226b. The outer portion 226b of each first comb drive 211 extends to outer radial extremity 221. A plurality of comb drive fingers 227 are longitudinally spaced apart along the length of bar 226 at a separation distance ranging from eight to 50 microns and preferably approximately 35 microns. The comb drive fingers 227 extend substantially perpendicularly from bar 226 and, like comb drive fingers 123, are each arcuate in shape. Fingers 227 have a length ranging from 25 to 190 microns and increase substantially linearly in length from bar inner portion 226a to bar outer portion 226b. Each of the comb drive fingers 227a has a proximal portion 227a and a distal portion 227b. The proximal portion 227 has a width ranging from four to 20 microns and preferably approximately 10 microns, and the distal portion 227b has a width less than the width of proximal portion 227a and, more specifically, ranging from two to 12 microns and preferably approximately six microns.

Second comb drives 212 and mirror holder 202 are part of a movable or rotatable frame 231 spaced above substrate 102 by air gap 118 so as to be electrically isolated from the substrate and movable relative to the substrate and first comb drives 211. Frame 231 includes a first arm 232, a second arm 233, a third arm 236 and a fourth arm 237, each of which extend in a substantial radial direction from axis of rotation 206. First and fourth arms 232 and 237 are symmetrically disposed relative to the centerline of microactuator 101 and second and third arms 233 and 236 are also symmetrically disposed relative to such centerline. First and fourth arms 232 and 237 are each U-shaped in conformation and formed from first and second bars 241 and 242. The first bar 241 has a first or inner radial portion 241a in close proximity to axis 206 and a second or outer radial portion 241b that extends to outer radial extremity 221. Similarly, second bar 242 has a first or inner radial portion 242a and a second or outer radial portion 242b. Outer radial portions 241b and 242b are joined by a base member 243 at outer radial extremity 221. Inner radial portion 241a of the first bar 241 is joined to mirror holder 202, while inner radial portion 242a of second bar 242 extends freely adjacent the mirror holder 202. Second and third arms 233 and 236 are joined at their inner portions to mirror holder 202.

First bar 241 of first arm 232 forms part of second comb drive 212 of first comb drive assembly 203a, while second bar 242 of first arm 232 serves as part of the second comb drive 212 of second comb drive assembly 204a. A plurality of comb drive fingers 251 are longitudinally spaced apart along the length of such first bar 241 for forming the comb drive fingers of first comb drive assembly 203a, while a plurality of comb drive fingers 251 are longitudinally spaced apart along the length of second bar 242 of such first arm 232 for forming the comb drive fingers of first comb drive assembly 204a. Comb drive fingers 251 are substantially similar to comb drive fingers 227 and have a first or proximal portion 251a joined to the respective bar 241 or 242 and a second or distal portion 251b extending from such proximal portion 251a. Distal portions 251b have a width less than the width of proximal portions 251a. Arcuate comb drive fingers 251 are offset relative to comb drive fingers 227 so that comb drive fingers 251 can interdigitate with comb drive fingers 227. First bar 241 of fourth arm 237 similarly serves as part of second comb drive 212 of second comb drive assembly 204d, while second bar 242 of the fourth arm 237 serves as part of the second comb drive 212 for first comb drive assembly 203d. Comb drive fingers 251 extend from first and second bars 241 and 242 of fourth arm 237.

Second and third arms 233 and 236 are included in second comb drives 212 of first comb drive assemblies 203b and 203c and second comb drive assemblies 204b and 204c. The second arm 233 has a first or inner radial portion 233a joined to mirror holder 202 and a second or outer radial portion 233b adjacent outer radial extremity 221. Third arm 236 is similar in construction to second arm 233 and has a first or inner radial portion 236a and a second or outer radial portion 236b. A first plurality of comb drive fingers 251 are longitudinally spaced apart along the length of one side of second arm 233 for forming the second comb drive of second comb drive assembly 204b and a second plurality of comb drive fingers 251 are longitudinally spaced apart along the length of the other side of second arm 233 for forming the second comb drive of first comb drive assembly 203b. Similarly, a first plurality of comb drive fingers 251 are longitudinally spaced apart along one side of third arm 236 for forming second comb drive 212 of first comb drive assembly 203c and a second plurality of comb drive fingers 251 are longitudinally spaced apart along the opposite side of the third arm 236 for forming second comb drive 212 of second comb drive assembly 204c. The second and third arms 233 and 236 can optionally be joined by a link 252 at the respective inner radial portions 233 and 236a for enhancing the rigidity of the arms 233 and 236.

Means including first and second spaced-apart springs 213 and 214 are included within rotary electrostatic microactuator 201 for movably supporting mirror holder 202 and second comb drives 212 over substrate 102. Springs 213 and 214 are symmetrically disposed about the centerline of microactuator 201 and preferably have a length which approximates the length of at least some of first and second comb drive assemblies 203 and 204. Base 219 of microactuator 201 includes an attachment or bracket member 253 which has a portion intersecting axis of rotation 206 and serves to secure first and second springs 213 and 214 to substrate 102. Each of the springs 213 and 214 is formed from a single beam-like spring member 256 having a first or inner radial end portion 256a joined at its end to bracket member 253 and a second or outer radial end portion 256b joined to base member 243 of the respective first arm 232 or fourth arm 237. More specifically, first spring 213 extends from bracket member 253 up the center of first arm 232 for joinder to the center of base member 243. Second spring 214 extends from bracket member 253 radially outwardly through the center of fourth arm 237 for joinder to the center of base member 243. Inner end portions 256a of spring members 256 are joined to the bracket member 253 at axis of rotation 206. The spring members 256 have a width ranging from one to 10 microns and preferably approximately four microns. Respective first and fourth arms 232 and 237 serve to secure outer end portions 256b of the first and second springs 213 and 214 to mirror holder 202.

At least one comb drive assembly and preferably at least one first comb drive assembly 203 and at least one second comb drive assembly 204 is disposed between first and second springs 213 and 214. More specifically, first comb drive assemblies 203b and 203c and second comb drive assemblies 204b and 204c, each of which is formed in part by second and third arms 233 and 236, are angularly disposed between first and second springs 213 and 214. Additionally, first comb drive assembly 203a and second comb drive assembly 204d, symmetrically disposed relative to each other about the centerline of microactuator 201, are angularly disposed between first and second springs 213 and 214.

Comb drive fingers 227 and 251 of first and second comb drives 211 and 212 are not substantially fully interdigitated when in their first or rest positions shown in FIG. 3. Although the term not substantially fully interdigitated is broad enough to cover comb drive fingers which are not interdigitated when in their rest positions, such as comb drive fingers 123 and 127 of microactuator 101 shown in FIGS. 1 and 2, such term also includes comb drive fingers which are partially interdigitated when in their rest positions. In microactuator 201, distal portions 227b and 251b of the comb drive fingers are substantially interdigitated when the comb drives 211 and 212 are in their at rest positions.

At least one and as shown all of first and second comb drive assemblies 203 and 204 are not centered along a radial extending outwardly from axis of rotation 206. In this regard, distal ends 261 of comb drive fingers 227 for each comb drive assembly 203 or 204 are aligned along an imaginary line that does not intersect axis of rotation 206 and, as such, is spaced-apart from the axis 206. Similarly, distal ends 262 of comb fingers 251 extend along an imaginary line which does not intersect axis of rotation 206. Each of first and second comb drive assemblies 203 and 204 thus resembles a sector of a semicircle that is offset relative to a radial of such semicircle.

Second comb drives 212 of first and second comb drive assemblies 203 and 204 are each movable in a direction of travel about axis of rotation 206 between a first or rest position, as shown in FIG. 3, in which comb drive fingers 227 and 251 are not substantially fully interdigitated and a second position (not shown) in which comb drive fingers 227 and 251 are substantially fully interdigitated such as discussed above with respect to comb fingers 123 and 127 of microactuator 101. Second comb drives 212 of first comb drive assemblies 203 are in their second positions when second comb drives 212 of second comb drive assemblies 204 are in their first position and, similarly, the second comb drives 212 of assemblies 204 are in their second positions when the second comb drives 212 of assemblies 203 are in their first positions.

Electrical means is included within microactuator 201 for driving second comb drives 212 between their first and second positions. Such electrical means can include a controller and voltage generator 161 electrically connected to a plurality of electrodes provided on the substrate 102 by means of a plurality of electrical leads 162. For simplicity, controller 161 and leads 162 are not shown in FIG. 3. Such electrodes, each of which is substantially similar to the electrodes discussed above with respective to microactuator 101, include a ground or common electrode 266 electrically coupled by lead 267 to bracket member 253, at least one drive electrode 271 coupled directly or by means of lead 272 to first comb drive 211 of first comb drive assemblies 203 and one or more drive electrodes 273 coupled directly or by means of lead 274 to first comb drives 211 of second comb drive assemblies 204. Several leads 274 extending out of the plane of microactuator 201 are shown in phantom lines in FIG. 3. The position of mirror holder 202 can optionally be monitored in the manner discussed above with respect to microactuator 101.

In operation, rotary electrostatic microactuator 201 is used in substantially the same manner as discussed above with respect to rotary electrostatic microactuator 101. When used as part of a fiber-optic network of a telecommunications system, a micromirror (not shown) can be mounted to mirror holder 202, for example by means of insertion into a recess or slot 276 provided in the mirror holder 202, for rotation about axis of rotation 206. The mirror extends out of the plane of microactuator 201 and has a reflective face (not shown) which preferably intersects axis of rotation 206. The recess 276 for receiving mirror need not be centered on axis of rotation 206.

As discussed above, controller 161 provides voltage potentials to comb drives 212 of one of first and second comb assemblies 203 or 204 to drive mirror holder 202 in opposite first and second angular directions about axis 206. Suitable voltage potentials to electrodes 271 and 273 for so rotating mirror holder 202 can range from 20 to 250 volts and preferably range from 60 to 180 volts. Microactuator 201 is capable of +/−six degrees angular rotation, that is a rotation of six degrees in both the clockwise and counterclockwise directions for an aggregate rotation of twelve degrees, when such drive voltages are utilized.

In an alternative electrical drive configuration for electrostatic microactuator 201, controller 161 applies a ground potential to electrode 271 coupled to first comb drives 211 of first comb drive assemblies 203 and a fixed maximum potential to electrode 273 coupled to first comb drives 211 of second comb drive assemblies 204. A variable potential between the ground potential and the fixed maximum potential is applied by the controller to common electrode 266 coupled to bracket member 253 and hence second comb drives 212. When the potential applied to common electrode 266 is equal to half of the maximum potential, an equal potential differences exist between electrodes 273 and 266 and between electrodes 271 and 266 resulting in approximately equal forces tending to rotate mirror holder 202 in counterclockwise and clockwise directions and thus resulting in no net rotation of the mirror holder 202. As the drive voltage applied to common electrode 266 is varied from this half value, an increasing net force is provided which results in net rotation of mirror holder 202 from its rest position. When the applied potential to common electrode 266 is at either ground or the fixed maximum value, a maximum force substantially equal to the drive force that occurs when a similar maximum drive voltage is applied to either electrode 273 or 271 and common electrode 266 is grounded is then applied so as to cause rotation of mirror holder 202. Similar voltages to those discussed above can be applied and similar rotations can be achieved. This alternative drive configuration requires only a single variable potential source and smoothly varies the position of mirror holder 202 around its rest position by varying only a single source. The number of electrical components in controller 161 and thus the cost of the actuator system can be reduced with this drive configuration.

Radially-extending first and second springs 213 and 214 provide radial stiffness to rotatable frame 231 and thus second comb drives 212. Inner end portions 256a of spring members 256 advantageously join to substrate 102 at the point of intersection of axis of rotation 206 with the substrate. Outer end portions 256b of the springs 213 and 214 are secured to second comb drives 212 either directly or by means of rotatable frame 231 adjacent outer radial extremity 221. Springs 213 and 214 are spaced apart at an angle ranging from approximately 30° to 90° to constrain microactuator 201 against linear accelerations in the manner discussed above with respect to microactuator 101. The nonfolded springs 213 and 214 require less surface area for deflection than the folded springs discussed above and thus permit more surface area to be allocated to comb drive assemblies 203 and 204.

First and second comb drive assemblies 203 and 204 are relatively densely packed within rotary electrostatic microactuator 201. Such packing is permitted, in part, by the offset nature of the comb drive assemblies 203 and 204. As discussed above, distal ends 261 and 262 of comb drive fingers 227 and 251 and the radial centerline of each of first and second comb drive assemblies 203 and 204 does not intersect axis of rotation 206. This offsetting of comb drive assemblies 203 and 204 also permits inner radial portions 226a of bars 226 to have a greater width, and thus have increased stability, and comb drive fingers 227 and 251 at the inner proximal end portions of each comb drive assembly 203 and 204 to be larger in length than would be permitted for a microactuator of comparable comb drive density but having comb drive assemblies 203 and 204 that are radially aligned with axis of rotation 206. As such, relatively greater rotational forces and torque are permitted by electrostatic microactuator 201.

The configuration of comb drive fingers 227 and 251 also permits relatively greater rotational forces in microactuator 201. In this regard, comb drive fingers 227 and 251 are partially interdigitated when in their at rest positions shown in FIG. 3. Since the spacing between adjacent comb drive fingers 227 and 251 can be limited by available etching techniques, distal portions 227b and 251b of the comb drive fingers 227 and 251 have been narrowed in width. Upon movement of second comb drives 212 to their second positions, distal portions 251b interdigitate with proximal portions 227a of the comb drive fingers of first comb drive 211 and the spacing or gap between adjacent comb drive fingers 227 and 251 is decreased so as to enhance the electrostatic attraction forces between first and second comb drives 211 and 212.

It should be appreciated that the invention hereof is broad enough to cover any rotary electrostatic actuator that is approximately fanlike in shape or approximately semicircular or that has comb drive assemblies which subtend an angle of 180° or less, for example 90°, about an axis of rotation. Such configurations permit the axis of rotation to be placed adjacent a base or end of the microactuator. Such a rotary electrostatic microactuator preferably includes arcuate comb drive fingers which extend in an angular direction about the axis of rotation. The invention is also broad enough to cover any rotary electrostatic microactuator having beam-like springs which secure to the substrate at the point at which the axis of rotation intersects the substrate. Each of such beam-like springs can consist of a single beam member or be folded so as to be U-shaped or V-shaped in conformation.

Figure 4:
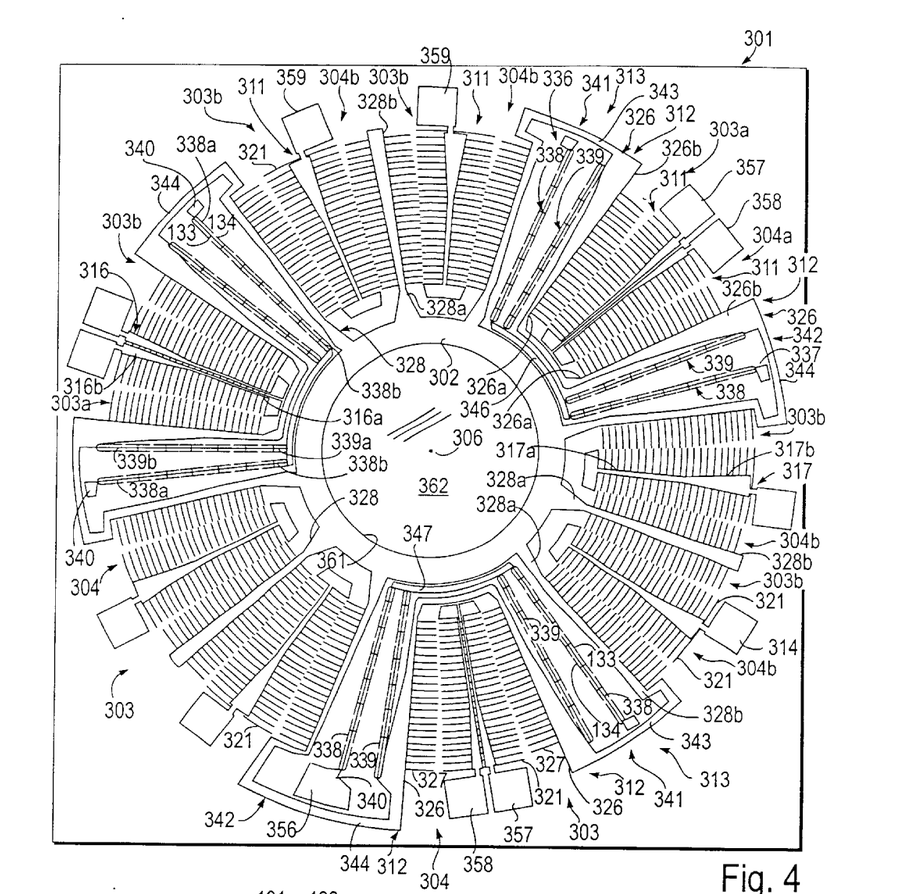
FIG. 4 is a plan view of a further embodiment of the rotary electrostatic microactuator of the present invention.

Rotary electrostatic microactuators can be provided which are other than fan-shaped or semicircular in plan and be within the scope of the present invention. For example, a rotary electrostatic microactuator 301 which is circular in plan is shown in FIG. 4. Microactuator 301 has similarities to microactuators 101 and 201 and like reference numerals have been used to describe like components of microactuators 101, 201 and 301. A rotatable member or ring 302 overlies substrate 102. A plurality of first and second comb drive assemblies 303 and 304 are carried by substrate 102 for rotating ring 302 in first and second opposite angular directions about an axis of rotation 306 extending through the center of ring 302 perpendicular to planar substrate. Each of the first and second comb drive assemblies 303 and 304 includes a first comb drive member or comb drive 311 mounted on substrate 102 and a second comb drive member or comb drive 312 overlying the substrate 102. A plurality of spring assemblies 312 are circumferentially disposed about axis of rotation 306 for supporting or suspending second comb drives 312 and ring 302 above substrate 102 and for providing radial stiffness to the second comb drives 312 and ring 302. The spring assemblies 313, comb drive assemblies 303 and 304 and ring 302 are formed from top layer 116, preferably using DRIE techniques. The spring assemblies 313, second comb drives 312 and ring 302 are spaced above substrate 102 by air gap 118. Such structures have thicknesses similar to the thicknesses discussed above with respect to the similar structures of microactuator 101.

At least one and preferably a plurality of first comb drive assemblies 303 are included in rotary electrostatic microactuator 301 and disposed about axis of rotation 306 for driving ring 302 in a clockwise direction about axis of rotation 306. At least one second comb drive assembly 304 and preferably a plurality of second comb drive assemblies 304 can be included in the microactuator 301 for driving the ring 302 in a counterclockwise direction about the axis 306. Each of the first and second comb drive assemblies 303 and 304 extends substantially radially from axis of rotation 306 and, in the aggregate, subtends an angle of approximately 360° so as to provide rotary microactuator 303 with its circular shape. More specifically, microactuator 301 has a plurality of three first comb drive assemblies 303a and a plurality of six first comb drive assemblies 303b, and has a plurality of three second comb drive assemblies 304a and a plurality of six second comb drive assemblies 304b. First and second comb drive assemblies 303 and 304 are interspersed relative to each other and are symmetrically disposed about axis of rotation 306. Each of the first and second comb drive assemblies 303 and 304 has a length ranging from 200 to 2,000 microns and preferably approximately 580 microns. Rotary electrostatic microactuator can be of any suitable size and preferably has a diameter ranging from 500 to 5,000 microns and more preferably approximately 2,800 microns. An outer radial extremity or periphery 314 resembling a circle extends around the circumference of electrostatic microactuator 301.

First comb drive 311 of each of first and second comb drive assemblies 303 and 304 is rigidly mounted to substrate 102 by means of silicon dioxide layer 117. Each of the first comb drives 311 for first comb drive assemblies 303a and second comb drive assemblies 304a has a radially-extending bar 316 provided with a first or inner radial portion 316a and a second or outer radial portion 316b. First comb drives 311 for adjacent pairs of first comb drive assemblies 303b and second drive assemblies 304b share a radially-extending bar 317 provided with a first or inner radial portion 317a and a second or outer radial portion 317b. Outer portions 316b and 317b extend to outer radial extremity 314 of microactuator 301. Bars 316 and 317 increase in width as they extend radially outwardly so as to increase the area of the bar secured to substrate 102 and thus increase the rigidity of such bars. A plurality of comb drive fingers 321 substantially similar to comb fingers 123 discussed above with respect to microactuator 101 are longitudinally spaced apart the length of bar 316 at any suitable separation distance such as discussed above with respect to comb fingers 123. A plurality of comb fingers 321 are longitudinally spaced apart on each side of bar 317 for comb drive assemblies 303b and 304b at similar separation distances. Comb fingers 321 are sized and shaped similar to comb fingers 123 and increase substantially linearly in length from the bar inner portion to the bar outer portion. The sharing of bar 317 by adjacent first comb drives 311 eliminates the space which would otherwise be provided between separate bars for such adjacent comb drives 311. This saved space can be incorporated into the length of comb drive fingers 321.

Second comb drives 312 are spaced above substrate 102 by air gap 118 so as to be moveable relative to the substrate and first comb drives 311. The second comb drives 312 have a construction similar to the first comb drives 311. More specifically, the second comb drives for first comb drive assemblies 303a and second comb drive assemblies 304a are each formed with a bar 326 that extends radially outwardly from axis of rotation 306. The bar 326 has a first or inner radial portion 326a in close proximity to axis 306 and a second or outer radial portion 326b that extends to radial extremity 314. A plurality of comb drive fingers 327, substantially similar to comb fingers 321, are longitudinally spaced apart along the length of bar 326 for each such second comb drive 312. The second comb drives 312 for first comb drive assemblies 303b and second comb drive assemblies 304b each have a bar 328 that extends radially outwardly from axis 306 and has a first or inner radial portion 328a joined to ring 302 and a second or outer radial portion 328b that extends to radial extremity 314. Second comb drives 312 of first and second comb drive assemblies 303b and 304b, which are back to back, share a single bar 328. A plurality of comb drive fingers 327 are longitudinally spaced apart along the length of bar 328 for each such second comb drive 312. Comb fingers 327 shorten in length near the outer radial portion of bars 326 and 328 to accommodate the increased thickness at the outer radial portions of respective bars 316 and 317. Arcuate comb fingers 327 of second comb drives 312 are offset relative to arcuate comb fingers 321 of first comb drives 311 so that comb fingers 327 can interdigitate with comb fingers 321 when the second comb drives 312 are rotated about axis 306 towards the stationary first comb drives 311.

Means including spring assemblies 313 are included within rotary electrostatic microactuator 301 for movably supporting ring 302 and second comb drives 312 over substrate 101. The spring assemblies 313 are circumferentially spaced apart around axis 306 at approximately 120° angular intervals so as to provide a symmetrical spring configuration. Each assembly 313 is provided with first and second spaced-apart folded springs 336 and 337 having a length which preferably approximates the length of first and second comb drive assemblies 303 and 304. Folded springs 336 and 337 are substantially similar to first and second springs 313 and 314 of microactuator 101. Although springs 336 and 337 can be formed from a single spring member, the springs 336 and 337 are preferably U-shaped or V-shaped in conformation and are shown as being substantially U-shaped. Each of springs 336 and 337 is made from first and second elongate spring members 338 and 339 which are each substantially beam-like in shape. First or linear spring member 338 has first and second end portions 338a and 338b and second or linear spring member 339 has first and second end portions 339a and 339b.

First end portion 338a of each spring 336 and 337 is secured at its end to an attachment member 340 formed from layer 116 and joined to substrate 102 by means of silicon dioxide layer 117. The second end portion 338b of each spring member 338 is secured to the first end portion 339a of each spring member 339. Spring members 338 and 339 each extend radially outwardly from axis of rotation 306 and preferably have a length approximating the length of first and second comb drive assemblies 303 and 304. Although first end portion 338a can be secured to substrate 102 adjacent ring 302, the first end portion 338a is preferably secured to substrate 102 adjacent outer radial extremity 314. Spring members 338 and 339 are preferably approximately equal in length and each have a width similar to the width of first and second spring members 131 and 132 discussed above. First and second sacrificial bars 133 and 134 extend along each side of each spring member 338 and 339.

Second end portion 339b of each spring 336 and 337 is secured to at least one of second comb drives 312. In this regard, microactuator 301 is provided with first and second movable frames 341 and 342 for each spring assembly 313. At least one comb drive assembly and preferably at least one first comb drive assembly 303 and at least one second comb drive assembly 304 is disposed between first and second movable frames 341 and 342 and thus between first and second springs 336 and 337. More specifically, one first comb drive assembly 303a and one second comb drive assembly 303b are disposed between first and second movable frames 341 and 342 and, together with first and second frames 341 and 342, are symmetrically disposed about a radial of microactuator 301.

First and second movable frames 341 and 342 are substantially similar to first and second movable frames 141 and 142 of microactuator 101 and are each substantially U-shaped in conformation. First movable frame 341 includes as side members the bar 328 of adjacent second comb drive assembly 304b and the bar 326 of adjacent first comb drive assembly 303a. An arcuate member 343 substantially similar to arcuate member 143 interconnects such bar outer portions 328b and 326b. Second movable frame 342 is similar in construction and includes as side members the bar 326 of adjacent second comb drive assembly 304a and the bar 328 of adjacent first comb drive assembly 303b. An arcuate member 334 substantially similar to arcuate member 144 interconnects such bar outer portions 326b and 328b. Second end portion 339b of first spring 336 is secured to arcuate member 343 adjacent to bar outer portion 326b of first comb drive assembly 303a, while second end portion 339b of second spring 337 is secured to arcuate member 344 adjacent bar outer portion 326b of second comb drive assembly of 304a. In this manner, first folded spring 336 is disposed inside first movable frame 341 and second folded spring 337 is disposed inside second movable frame 342. The bar inner portion 328a of the first movable frame 341 is joined to ring 302 and so serves to secure the first spring 336 to the ring 302. Similarly, the bar inner portion 328b of second movable frame 342b is joined to ring 302 for interconnecting spring 337 to ring 302.

An inner arcuate member or shuttle 346 is joined at opposite ends to first and second movable frames 341 and 342. One end of the shuttle 346 is secured to bar inner portion 326a of first movable frame 341 and the other end of the shuttle 346 is secured to bar inner portion 326a of second movable frame 342. A further arcuate member 347 is provided in microactuator 301 for rigidly securing together second end portions 338b of first and second springs 336 and 337. The arcuate member 347 overlies substrate 102 and extends at least partially around axis of rotation 306 between shuttle 346 and ring 302.

Second comb drives 312 of first and second comb drive assemblies 303 and 304 are movable in a direction of travel about axis of rotation 306 between first positions, shown in FIG. 4, in which comb drive fingers 321 and 327 are not substantially fully interdigitated and second positions, not shown, in which the comb drive fingers 321 and 327 are substantially fully interdigitated. Although comb drive fingers 321 and 327 can be partially interdigitated when second comb drives 312 are in their first positions, the comb drive fingers 321 and 327 are shown as being fully disengaged and thus are not interdigitated when second comb drives 312 are in their first positions. When in their second positions, comb fingers 327 of second comb drives 312 extend between respective comb fingers 321 of the first comb drives 311 in the same manner as discussed above with respect to microactuator 101.

Electrical means is included within microactuator 301 for driving second comb drives 312 between their first and second positions. Such electrical means includes controller and voltage generator 161 electrically coupled by means of electrical leads 162 to a plurality of electrodes provided on substrate 102. For simplicity, controller 161 and leads 162 are not shown in FIG. 4. Each of such electrodes is substantially similar in construction to electrodes discussed above with respect to microactuator 101. A ground electrode 356 electrically coupled to the first end portion 338a of one of the second folded springs 337 is provided for grounding second comb drives 312. A first drive electrode 357 is joined to the outer radial end portion of each first comb drive 311 of first comb drive assembly 303a and a second drive electrode 358 is joined to the outer radial end portion of each first comb drive 311 of second comb drive assembly 304a.

A common drive electrode 359 is joined to the outer radial end portion of each first comb drive 311 of second comb drive assemblies 303b and 304b. The position of ring 302 can optionally be monitored in the manner discussed above with respect to microactuator 101.

In one particularly suited application, rotary electrostatic microactuator 301 can be used in a data storage system such as in an optics module of a magneto-optical data storage system. Electrostatic microactuator 301 can be used to rotate the polarization launch angle of light into an optical fiber. In this regard, a central aperture 361 is provided in ring 302 for receiving a circular half wave plate 362 which is adhesively secured to ring 302.

The operation and use of electrostatic microactuator 301 is substantially similar to the operation and use described above with respect to microactuators 101 and 201. Ring 302 can be rotated in opposite first and second directions of angular travel about axis of rotation 306 by means of controller 161. When it is desired to rotate ring 302 in a clockwise direction about the axis 306, a voltage potential is supplied by the controller to first comb drives 311 of first comb drive assemblies 303. The amount of the resulting interdigitation of comb fingers 321 and 327, and thus the amount of rotation of ring 302, can be controlled by the amount of voltage supplied to the first comb drives 311. When it is desired rotate ring 302 in a counterclockwise direction about axis 306, a suitable voltage potential can be supplied to first comb drives 311 of second comb drive assemblies 304 to cause the respective comb fingers 321 and 327 to interdigitate. Second comb drive members 312 of one of first comb drive assemblies 303 or second comb drive assemblies 304 are in their second positions when the comb drive members 312 of the other of second comb drive assemblies 304 or first comb drive assemblies 303 are in their first positions. Suitable voltage potentials to drive comb drive assemblies 303 and 304 can range from 20 to 250 volts and preferably range from 60 to 150 volts. The electrostatic microactuator 301 is capable of +/−six degrees angular rotation when drive voltages of up to 130 volts are utilized.

Clockwise or counterclockwise rotation of ring 302 is initiated by initially supplying the drive voltage to either first drive electrode 357 relating to first comb drive assemblies 303a or second drive electrode 358 relating to second comb drive assemblies 304a. As discussed above, electrodes 357 and 358 are dedicated to specific first comb drives 311 and are not shared by back-to-back comb drives 311. When engagement of comb fingers 321 and 327 for first and second comb drive assemblies 303b and 304b begins, the drive voltage can then be supplied to common drive electrode 359. Such initial engagement of comb fingers 321 and 327 ensures that the proper second comb drive 312 is attracted to comb fingers 321 of shared comb drive bar 317.

Electrostatic microactuator 301 utilizes a six spring design, that is three spring assemblies 313 that each having first and second folded springs 336 and 337. This spring configuration permits a spring 336 or 337 to be circumferentially disposed at approximately 60° intervals about axis of rotation 306. As discussed above, springs 336 and 337 provide radial stiffness to second comb drives 312 to inhibit snap over between comb fingers 321 and 327. A circular microactuator similar to microactuator 301 can be provided with less than or more than six springs 336 and 337 and be within the scope of the present invention. A trade off exists between allocating space to springs to provide radial stiffness or to comb drives assemblies to provide rotational force. An aggregate number of springs 336 and 337 ranging from three to six in number has been found to be preferable.

The circular and thus symmetrical configuration of microactuator 301 facilitates providing the center of mass of the microactuator along axis of rotation 306. Such balancing inhibits undesired disturbances to ring 302 by shock, vibration or linear accelerations due to external influences.

Figure 5:
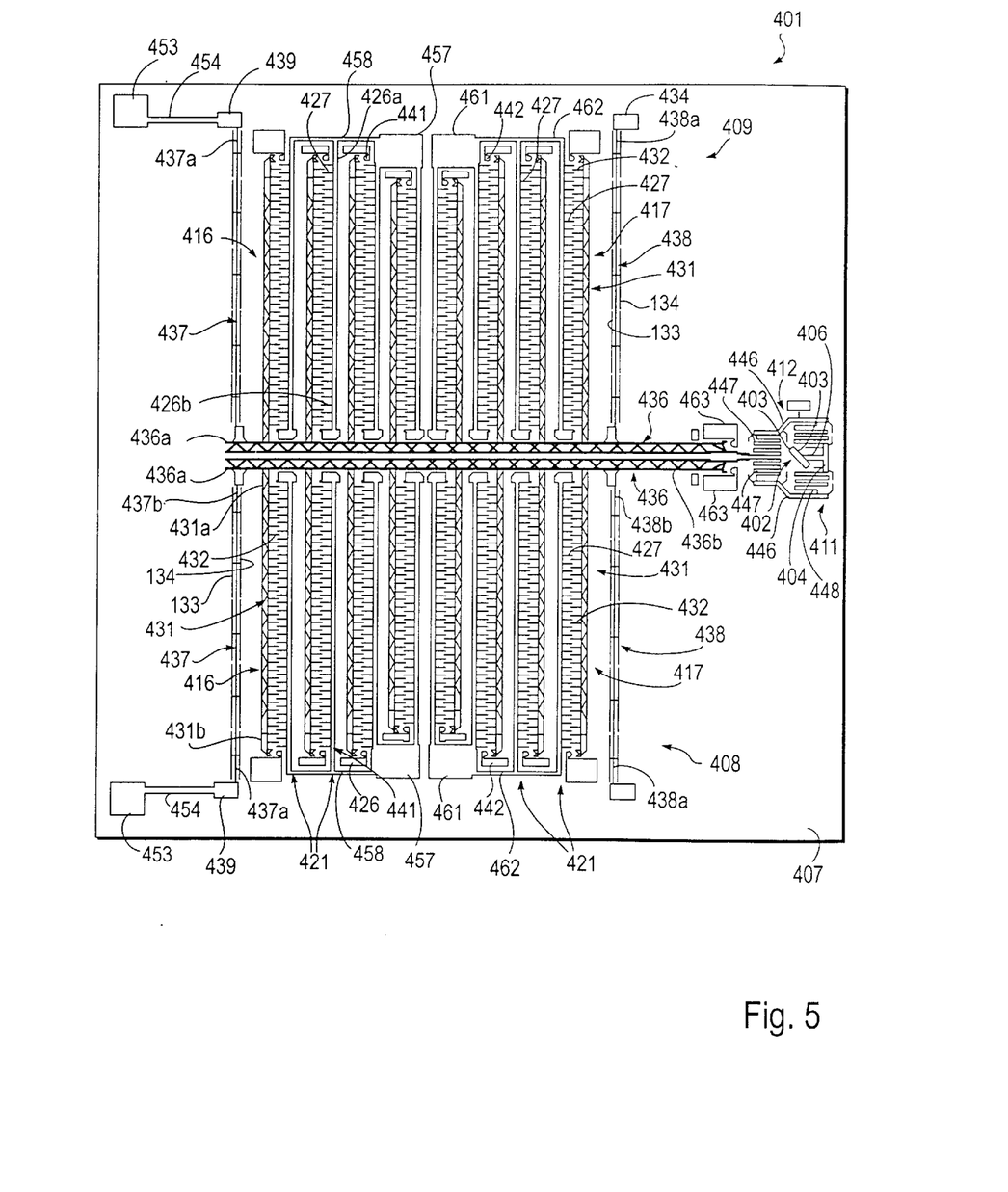
FIG. 5 is a plan view of yet another embodiment of the rotary electrostatic microactuator of the present invention.

The rotary electrostatic microactuators of the present invention can utilize other than radially-extending comb drive assemblies. An exemplary push-pull microactuator using coupled linear electrostatic micromotors is shown in FIG. 5. Rotary electrostatic microactuator 401 therein is similar in certain respects to microactuators 101, 201 and 301 and like reference numerals have been used to describe like components of the microactuators 101, 201, 301 and 401. The microactuator 401 includes a rotatable member 402 comprising a mirror holder, for mounting to the microactuator 401 a micromirror 403 extending out of the plane of microactuator 401, and a T-shaped bracket 404 secured to micromirror 403. The profile of micromirror 403 is shown in FIG. 5. The rotatable member 402 rotates about an axis of rotation 406 extending perpendicular to planar substrate 102. The axis of rotation 406 intersects micromirror 403 at its reflective surface 403a and is identified as a point by reference numeral 406 in FIG. 5. Microactuator 401 is provided with at least one side 407 and rotatable member 402 is disposed adjacent the side 407. The microactuator 401 has first and second linear micromotors 408 and 409 and first and second couplers 411 and 412 for respectively securing first and second micromotors 408 and 409 to bracket 404.

First and second micromotors 408 and 409 are substantially identical in construction and are formed atop the substrate 102 from upper layer 116. The micromotors each includes at least one comb drive assembly and preferably includes at least one first comb drive assembly 416 and at least one second comb drive assembly 417. As shown, each of the micromotors 408 and 409 includes a plurality of four first comb drive assemblies 416 and a plurality of four second comb drive assemblies 471 aligned in parallel. First comb drive assemblies 416 are disposed side-by-side in a group and second comb drive assemblies 417 are similarly disposed side-by-side in a group. The group of assemblies 416 are disposed in juxtaposition to the group of assemblies 417.

Comb drive assemblies 416 and 417 can be of any suitable type. In one preferred embodiment, the comb drive assemblies are similar to the comb drive assemblies described in U.S. Pat. No. 5,998,906 issued Dec. 7, 1999 and in copending U.S. patent application Ser. No. 09/135,236 filed Aug. 17, 1998. The comb drive assemblies 416 and 417 are each provided with a first comb drive member or comb drive 421 mounted on substrate 102 and a second comb drive 422 overlying the substrate. First comb drives 421 are each formed from an elongate bar 426 having first and second end portions 426a and 426b. A plurality of linear comb drive fingers 427, shown as being linear, are secured to one side of the bar in longitudinally spaced-apart positions along the length of the bar. Comb drive fingers or comb fingers 427 extend perpendicularly from bar 426 and, as shown, can be of equal length and have a constant width along their length. Second comb drives 422 are similar in construction to first comb drives 421 and are each formed from a bar 431 having first and second end portions 431a and 431b. A plurality of linear comb fingers 432, shown as being linear, extend from one side of the bar 431 in longitudinally spaced-apart positions. Comb fingers 432 are substantially identical to comb fingers 427, but are offset relative to the comb fingers 427. When comb drive assemblies 416 and 417 are in their home or rest positions, comb fingers 427 and 432 are not substantially fully interdigitated and, preferably, are partially interdigitated as shown in FIG. 5.

An elongate member or shuttle 436 is included in each of first and second micromotors 408 and 409. Shuttle 436 has first and second end portions 436a and 436b. First end portion 431a of each of bars 431 is secured to shuttle 436 so that bars 431 extend perpendicularly from one side of the shuttle 436 between shuttle end portions 436a and 436b.

First and second spaced-apart spring members 437 and 438 are included in each of micromotors 408 and 409. Springs 437 and 438 can be of any suitable type and are preferably formed from at least one elongate beam-like member. In one preferred embodiment, springs 437 and 438 each consist of a single such beam-like member similar to first spring member 131 and to second spring member 132 discussed above. Springs 437 and 438 are substantially identical in construction and each include first and second sacrificial bars 133 and 134 disposed along opposite sides of the springs for the purposes discussed above. First spring 437 has first and second end portions 437a and 437b and second spring 438 has first and second end portions 438a and 438b. The spring second end portion 437b is secured to shuttle first end portion 436a and the spring second end portion 438b is secured to shuttle second end portion 436b. As a result, at least one and as shown all of first and second comb drive assemblies 416 and 417 are disposed between first and second springs 437 and 438. The springs 437 and 438 preferably extend perpendicular to shuttle 436 when comb drive assemblies 416 and 417 are in their home or rest positions. Each of the first and second springs 437 and 438 preferably has a length approximating the length of comb drive assemblies 416 and 417 so that first end portions 437a and 438a are disposed adjacent the second end portions 426b and 431b of the comb drive bars 426 and 431. An attachment block 439 is secured to substrate 102 for each spring 437 and 438 and serves to attach the first end portions 437a and 438a of the first and second springs to the substrate 102.

Second comb drives 422, shuttle 436 and first and second springs 437 and 438 are spaced above substrate 102 by air gap 118 so as to be electrically isolated from the substrate and movable relative to the substrate. These structures can have any suitable thickness and preferably each have a thickness ranging from 10 to 200 microns and more preferably approximately 85 microns. First and second springs 437 and 438 are included within the means of microactuator 401 for suspending and movably supporting second comb drives 422 over substrate 102.

The second comb drives 422 are movable in a linear direction of travel relative to first comb drives 421 between first positions, as shown in FIG. 5, in which comb fingers 427 and 432 are not substantially fully interdigitated and second positions in which the comb fingers 427 and 432 are substantially fully interdigitated. When in their second positions, comb fingers 432 extend between respective comb fingers 427 and approach but preferably do not engage first comb drive bar 426. Second comb drive members 422 of first comb drive assemblies 416 are in their second positions when second comb drives 422 of second comb drive assemblies 417 are in their first positions. Conversely, the second comb drives of first comb drive assemblies 416 are in their first positions when the second comb drives of second comb drive assemblies 417 are in their second positions.

The movement of second comb drives 422 to their first and second positions causes shuttle 436 to move in opposite first and second linear directions relative to substrate 102. Such directions of travel are substantially perpendicular to the disposition of the elongate first and second comb drive assemblies 416 and 417. A plurality of first stops 441 are secured to substrate 102 for limiting the travel of second comb drives 422 of first comb drive assemblies 416 towards their respective first comb drives 421. A plurality of similar second stops 442 are secured to the substrate for limiting the travel of second comb drives 422 of second comb drive assemblies 417 towards their respective first comb drives 421. In one preferred embodiment, first and second micromotors 408 and 409 are disposed in juxtaposition so that respective shuttles 436 are disposed side-by-side in parallel with each other. Second end portions 436b of the shuttles 436 each generally point towards micromirror 403 and are centered relative to axis of rotation 406.

First and second couplers 411 and 412 are suspended above substrate 102 by air gap 118 and have a first end secured to shuttle second end portion 436b and a second end secured to the bracket 404. The couplers 411 and 412 are preferably symmetrically disposed relative to each other with respect to axis of rotation 406. First coupler 411 secures shuttle 436 of the first micromotor 408 to one side of bracket 404 and second coupler 412 secures second micromotor 409 to the other side of bracket 404. In one preferred embodiment, each of the first and second couplers has at least one spring member or coupling spring to provide a non-rigid connection between the shuttle 436 and the bracket 404. In a particular preferred embodiment, each of the first and second couplers 411 and 412 includes a rigid strip 446 secured at one end to shuttle 436 by means of a first coupling spring 437 and secured at its other end to bracket 404 by a second coupling spring 448.

Electrical means is included within microactuator 401 for driving second comb drives 422 of the first and second micromotors 408 and 409 between their first and second positions. Such electrical means includes a suitable controller and voltage generator such as controller and voltage generator 161 electrically coupled to a plurality of electrodes by means of a plurality of electrical leads 162. For simplicity, controller 161 and leads 162 are not shown in FIG. 5. Such electrodes, each of which is substantially similar to the electrodes described above with respect to microactuator 101, include first and second ground electrodes 453 which are electrically coupled by means of respective leads 454 to attachment block 439 for first springs 437 so as to electrically ground first and second springs 437 and 438, shuttle 436 and second comb drives 422 of each of the micromotors 408 and 409. A first drive electrode 457 is electrically coupled, either directly or by means of leads 458, to first comb drives 421 of the first comb drive assemblies 416 of each micromotor 409 and 409. A second drive electrode 461 is electrically coupled, either directly or by means of lead 462, to the first comb drives 421 of the second comb drive assemblies 417 of the micromotors 408 and 409. An additional stop 463 secured to substrate 102 can additionally be provided for each micromotor 408 and 409 to limit the forward travel of shuttle 436 towards rotatable member 402. The position of rotatable member 402 can optionally be monitored in the manner discussed above with respect to microactuator 101.

In operation and use, controller 161 can be utilized to drive the second comb drives 422 of each of first and second micromotors 408 and 409, in the manner described above with respect to micromotors 101, 201 and 301, so that shuttles 436 of the micromotors 408 and 409 travel in opposite directions relative to substrate 102 and the axis of rotation 406. When, for example, equal voltages are supplied to the drive electrode 457 of first micromotor 408 and drive electrode 461 of micromotor 409, shuttle 436 of the first micromotor 408 is caused to move towards axis 406 and shuttle 436 of the second micromotor 409 is caused to move away from axis 406 so as to cause first and second couplers 411 and 412 to pivot the rotatable member 402 in a counterclockwise direction about axis 406. In a similar manner, the first and second micromotors 408 and 409 can be utilized to pivot the rotatable member 402 in a clockwise direction about axis 406. Suitable voltage potentials to electrodes 457 and 461 for so rotating micromirror 403 can range from 20 to 200 volts and preferably range from 60 to 150 volts. Microactuator 401 is capable of +/−10° angular rotation, that is a rotation of 10° in both the clockwise and counterclockwise directions for an aggregate rotation of 20°, when such drive voltages are utilized. Mirror surface 403a can be used to accurately and repeatedly reflect a laser light beam.

The linear deflection of the micromotors 408 and 409 closely matches the circumferential motion of the rotatable member. Thus, if the linear micromotors 408 and 409 are each capable of +/−30 microns of linear motion, the rotatable member 402 will rotate slightly less than the arctan (30/R), where R is the effective radius of the rotatable member 402. As can be seen, the angular range depends on the effective circumference of the rotatable member 402; larger angles can be obtained for rotatable members with smaller effective circumferences and smaller angles can be obtained for rotatable members with larger effective circumferences. The flexible coupling springs 447 and 448 enhance the translation of the longitudinal movement of shuttles 436 to rotational movement of micromirror 403 and bracket 404.

The symmetrical structure of first and second micromotors 408 and 409 and first and second couplers 411 and 412, as well as the symmetrical disposition of first micromotor 408 and first coupler 411 relative to second micromotor 409 and second coupler 412, ensure proper push-pull so that the micromirror and bracket 404 pivot about the axis of rotation 406. In this regard, first micromotor 408 and first coupler 411 are symmetrical to second micromotor 409 and second coupler 412 relative to an imaginary line extending between shuttles 436 and axis of rotation 406. The first and second couplers 411 and 412 are joined to bracket 404, and the micromirror 403 and bracket 404 are sized and shaped, so that reflective surface 403a of micromirror 403 pivots at axis of rotation 406.

Nonfolded springs 437 and 438 can be utilized in micromotors 408 and 409 because the required stroke length of comb drive assemblies 416 and 417, and hence the length of comb fingers 427 and 432, are relatively small in the microactuator 401. As a result, the sidewise movement of comb fingers 427 and 432 resulting from bending of springs 437 and 438 during interdigitation of the comb fingers is not significant. The symmetrical disposition of micromotors 408 and 409 compensates for any such sidewise movement of the shuttle 436 of the first micromotor 408 relative to the sidewise movement of the shuttle 436 of the second micromotor 409. Push-pull microactuators with folded springs can be provided.

Other rotary electrostatic microactuators realizing linear electrostatic micromotors can be provided and be within the scope of the present invention. For example, a push-pull microactuator utilizing more than two micromotors 408 and 409 can be provided. It is preferable that the micromotors of any such rotary microactuator be symmetrically disposed about the axis of rotation of the microactuator. Such microactuators having the axis of rotation at the center of the microactuator, as opposed to at one side of the microactuator as in microactuator 401, are contemplated.

It should be appreciated that a rotary electrostatic microactuator of the type described herein can be provided with prebent springs or suspensions of the type disclosed in U.S. Pat. No. 5,998,906 that issued Dec. 7, 1999 or in copending U.S. patent application Ser. No. 09/135,236 filed Aug. 17, 1998 and be within the scope of the present invention. Such prebent springs are nonlinear and thus in a "bent" condition when at rest in a static undetected condition. The spring members of such springs straighten towards a linear condition as the comb drive fingers interdigitate and thus increase in axial stiffness during interdigitation. Such an embodiment of a rotary electrostatic microactuator can be provided with two or more prebent springs, one or more springs which straighten during interdigitation of comb drive fingers driving the microactuator in a first direction and one or more springs which straighten during interdigitation of comb drive fingers driving the microactuator in an opposite second direction. Linear or angular traveling comb drive assemblies can be provided in such rotary microactuators. Use of such prebent springs results in improved stiffness in the springs at or near the maximum travel of the comb drives and accompanying structure, which is particularly important in microactuators having large deflections.

Rotary electrostatic microactuators can be provided which incorporate various features of the microactuators herein. Rotary electrostatic microactuators that use arcuate comb drive fingers can be circular in shape or have other noncircular shapes such as fanlike shapes or shapes resembling the sector or segment of a circle. Radially-extending folded or nonfolded springs can be provided. Such springs can be prebent or linear when in their rest positions. The comb drive assemblies of the microactuator can be centered on a radial or offset from a radial. The comb drive fingers can be spaced apart or partially interdigitated when in their rest positions and can have a variety of shapes.

As can be seen from the foregoing, a rotary electrostatic microactuator with an improved range of angular motion has been provided. Side instability forces in the one or more comb drive assemblies of the microactuator are minimized and rotation of a member extending out of the plane of the microactuator is permitted. In one embodiment, the rotary electrostatic microactuator is other than circular in shape. The axis of rotation of the microactuator can be disposed adjacent a side of the microactuator.

What is claimed is:

1. An electrostatic microactuator comprising a substantially planar substrate, at least one comb drive assembly having first and second comb drive members, the first comb drive member being mounted on the substrate, first and second spaced-apart springs, each spring having a first end portion coupled to the substrate and a second end portion coupled to the second comb drive member for suspending the second comb drive member over the substrate, each of the first and second comb drive members being provided with a plurality of comb drive fingers, each of the comb drive fingers having a proximal portion with a width and a distal portion with a width less than the width of the proximal portion, the second comb drive member being movable relative to the first comb drive member from a rest position in which the distal portions of the comb drive fingers of the first and second comb drive members are interdigitated to an actuated position in which the distal portions of the comb drive fingers of the second comb drive member are interdigitated with the proximal portions of the comb drive fingers of the first comb drive member and the distal portions of the comb drive fingers of the first comb drive member are interdigitated with the proximal portions of the comb drive fingers of the second comb drive member.

2. The microactuator of claim 1 further comprising a rotatable member overlying the substrate, the second comb drive member being coupled to the rotatable member for driving the rotatable member about an axis of rotation extending perpendicular to the substrate.

3. The microactuator of claim 2 wherein the first and second springs each extend radially from the axis of rotation.

4. The microactuator of claim 2 wherein the at least one comb drive assembly includes a plurality of comb drive assemblies, the rotatable member, the plurality of comb drive assemblies and the first and second springs when viewed together in plan having the shape of a fan.

5. The microactuator of claim 4 wherein the rotatable member, the plurality of comb drive assemblies and the first and second springs when viewed together in plan subtend an angle of approximately 180° or less about the axis of rotation.

6. An electrostatic microactuator comprising a substantially planar substrate, a rotatable member overlying the substrate for rotation about an axis of rotation extending perpendicular to the substrate, at least one electrostatic drive assembly extending substantially radially from the axis of rotation and having first and second electrostatic drive members, the first electrostatic drive member being mounted on the substrate and the second electrostatic drive member being coupled to the rotatable member, and not more than first and second spaced-apart springs, each spring having a first end portion coupled to the substrate and a second end portion coupled to the second electrostatic drive member for suspending the second electrostatic drive member and the rotatable member over the substrate, the second electrostatic drive member being movable in a direction of travel about the axis of rotation between first and second positions relative to the first electrostatic drive member.

7. The microactuator of claim 6 wherein the at least one electrostatic drive assembly is disposed between the first and second spaced-apart springs.

8. The microactuator of claim 6 wherein each of the first and second electrostatic drive members is a comb drive member provided with comb drive fingers.

9. The microactuator of claim 8 wherein the second comb drive member is movable relative to the first comb drive member from a first position in which the comb drive fingers of the first and second comb drive members are not substantially fully interdigitated to a second position in which the comb drive fingers of the first and second comb drive members are substantially fully interdigitated.

10. The microactuator of claim 6 wherein the first and second springs each extend radially from the axis of rotation.

11. The microactuator of claim 6 further comprising a movable structure overlying the substrate, the movable structure including the rotatable member and the second electrostatic drive member and having a center mass at the axis of rotation for inhibiting undesirable movement of the movable structure in response to externally applied accelerations to the microactuator.

12. A micromechanical device comprising a substantially planar substrate, a rotatable member overlying the substrate for rotation about an axis of rotation extending perpendicular to the substrate, not more than first and second spaced-apart springs, each spring having a first end portion coupled to the substrate and a second end portion coupled to the rotatable member for suspending the rotatable member over the substrate, and a micromotor carried by the substrate and coupled to the rotatable member for driving the rotatable member about the axis of rotation between first and second positions relative to the substrate.

13. The device of claim 12 wherein the first and second springs each extend radially from the axis of rotation.

14. The device of claim 12 wherein the micromotor is disposed between the first and second spaced-apart springs.

15. An electrostatic microactuator comprising a substantially planar substrate, a rotatable member overlying the substrate for rotation about an axis of rotation extending perpendicular to the substrate, a plurality of electrostatic drive assemblies extending substantially radially from the axis of rotation, each of the plurality of electrostatic drive assemblies having a first electrostatic drive member mounted on the substrate and a second electrostatic drive member coupled to the rotatable member, and first and second spaced-apart springs, each spring having a first end portion coupled to the substrate and a second end portion coupled to the second electrostatic drive member for suspending the second electrostatic drive member and the rotatable member over the substrate, each second electrostatic drive member being movable in a direction of travel about the axis of rotation between first and second positions relative to the respective first electrostatic drive member, the rotatable member, the plurality of electrostatic drive assemblies and the first and second springs when viewed together in plan having the shape of a sector of a circle.

16. The microactuator of claim 15 wherein the rotatable member, the plurality of electrostatic drive assemblies and the first and second springs subtend an angle of approximately 180° or less about the axis of rotation.

17. The microactuator of claim 16 wherein the rotatable member, the plurality of electrostatic drive assemblies and the first and second springs subtend an angle of approximately 90° about the axis of rotation.

18. The microactuator of claim 15 wherein each of the first and second electrostatic drive members is a comb drive member having comb drive fingers.

19. The microactuator of claim 18 wherein the comb drive fingers of the first and second comb drive members are not substantially fully interdigitated when in the first position and the comb drive fingers of the first and second comb drive members are substantially fully interdigitated when in the second position.

20. The microactuator of claim 15 wherein the first and second springs each extend radially from the axis of rotation.

21. An electrostatic microactuator comprising a substantially planar substrate, a rotatable member overlying the substrate for rotation about an axis of rotation extending perpendicular to the substrate, a plurality of comb drive assemblies extending substantially radially from the axis of rotation, each of the plurality of comb drive assemblies having a first comb drive member mounted on the substrate and a second comb drive member coupled to the rotatable member and having the shape of a truncated sector of a circle, and first and second spaced-apart springs, each spring having a first end portion coupled to the substrate and a second end portion coupled to the second comb drive member for suspending the second comb drive member and the rotatable member over the substrate, each of the first and second comb drive members being provided with comb drive fingers, the comb drive fingers of the second comb drive member having respective distal ends which extend along an imaginary line that does not intersect the axis of rotation.

22. The microactuator of claim 21 wherein the comb drive fingers of the first comb drive member having respective distal ends which extend along an imaginary line that does not intersect the axis of rotation.

23. The microactuator of claim 21 wherein the second comb drive member is movable relative to the first comb drive member from a first position in which the comb drive fingers of the first and second comb drive members are not substantially fully interdigitated to a second position in which the comb drive fingers of the first and second comb drive members are substantially fully interdigitated.

24. The microactuator of claim 21 wherein the first and second springs each extend radially from the axis of rotation.

25. The microactuator of claim 21 wherein the rotatable member, the plurality of comb drive assemblies and the first and second springs when viewed together in plan have the shape of a sector of a circle.

26. The microactuator of claim 25 wherein the rotatable member, the plurality of comb drive assemblies and the first and second springs when viewed together in plan subtend an angle of approximately 180° or less about the axis of rotation.

27. An electrostatic microactuator comprising a substantially planar substrate, a rotatable member overlying the substrate for rotation about an axis of rotation extending perpendicular to the substrate, first and second linear micromotors for imparting substantially linear motion and a first coupler for connecting the first linear micromotor to the rotatable member and a second coupler for connecting the second micromotor to the rotatable member so as to utilize the substantially linear motion of the first and second micromotors for rotating the rotatable member about the axis of rotation.

28. The microactuator of claim 27 wherein the axis of rotation extends through the rotatable member.

29. The microactuator of claim 27 wherein each of the micromotors is an electrostatic micromotor having at least one comb drive assembly.

30. The microactuator of claim 27 wherein the first and second couplers comprise first and second flexural couplers.

31. The microactuator of claim 27 wherein the first and second micromotors are symmetrically disposed about the rotatable member.

32. The microactuator of claim 27 wherein the direction of linear travel of the first micromotor is parallel to the direction of linear travel of the second micromotor.

33. The microactuator of claim 27 wherein the first and second couplers comprise first and second unitary couplers.

34. An electrostatic microactuator comprising a substantially planar substrate, a rotatable member overlying the substrate for rotation about an axis of rotation extending perpendicular to the substrate, at least one electrostatic drive assembly having first and second electrostatic drive members, the first electrostatic drive member being mounted on the substrate and the second electrostatic drive member being coupled to the rotatable member, first and second spaced-apart folded springs, each folded spring having a first spring member coupled to a second spring member, each of the first and second spring members extending radially of the axis of rotation, each first spring member having an end portion coupled to the substrate and each second spring member having an end portion coupled to the second electrostatic drive member for suspending the second electrostatic drive member and the rotatable member over the substrate, the second electrostatic drive member being movable about the axis of rotation between first and second positions relative to the first electrostatic drive member.

35. The microactuator of claim 34 further comprising a connector overlying the substrate, each of the first spring members having an additional end portion coupled to the connector.

36. The microactuator of claim 35 wherein the additional end portions are coupled to the connector adjacent the axis of rotation.

37. The microactuator of claim 34 wherein each of the first and second electrostatic drive members is a comb drive member having comb drive fingers, the second comb drive member being movable relative to the first comb drive member from a first position in which the comb drive fingers of the first and second comb drive members are not substantially fully interdigitated to a second position in which the comb drive fingers of the first and second comb drive members are substantially fully interdigitated.

38. The microactuator of claim 34 wherein the at least one electrostatic drive assembly includes a plurality of electrostatic drive assemblies, the rotatable member, the plurality of electrostatic drive assemblies and the first and second springs when viewed together in plan having the shape of a fan.

39. The microactuator of claim 38 wherein the rotatable member, the plurality of electrostatic drive assemblies and the first and second springs when viewed together in plan subtend an angle of approximately 180° or less about the axis of rotation.

40. An electrostatic microactuator comprising a substantially planar substrate, a rotatable member overlying the substrate for rotation about an axis of rotation extending perpendicular to the substrate, a plurality of first spring members extending radially of the axis of rotation and a plurality of second spring members extending radially of the axis of rotation, a connector overlying the substrate, each first spring member having a first end portion coupled to the substrate and a second end portion coupled to the connector, each second spring member having a first end portion coupled to the connector and a second end portion coupled to the rotatable member for suspending the rotatable member over the substrate, the rotatable member being movable about the axis of rotation between first and second positions relative to the substrate.

41. The microactuator of claim 40 further comprising at least one comb drive assembly having first and second comb drive members, the first comb drive member being mounted on the substrate and the second comb drive member being coupled to the rotatable member for driving the rotatable member about the axis of rotation.

42. The microactuator of claim 41 wherein the at least one comb drive assembly has an outer periphery, the first end portion of each first spring member being coupled to the substrate near the outer periphery and the second end portion of each second spring member being coupled to the second comb drive member near the outer periphery, the second end portion of each first spring member and the first end portion of each second spring member being coupled to the connector near the axis of rotation.

43. The microactuator of claim 41 wherein each of the first and second comb drive members has comb drive fingers, the second comb drive member being movable relative to the first comb drive member from a first position in which the comb drive fingers of the first and second comb drive members are not substantially fully interdigitated to a second position in which the comb drive fingers of the first and second comb drive members are substantially fully interdigitated.

44. The microactuator of claim 41 wherein the at least one comb drive assembly includes a plurality of comb drive assemblies, the rotatable member, the plurality of comb drive assemblies and the first and second springs when viewed together in plan having the shape of a fan.

45. The microactuator of claim 44 wherein the at least one comb drive assembly includes a plurality of comb drive assemblies, the rotatable member, the plurality of comb drive assemblies and the first and second springs when viewed together in plan subtending an angle of approximately 180° or less about the axis of rotation.

46. A micromechanical device comprising a substrate, at least one connector overlying the substrate, a plurality of first beam-like springs coupling the at least one connector to the substrate, a movable member overlying the substrate for rotation about an axis of rotation extending perpendicular to the substrate, a plurality of second beam-like springs coupling the movable member to the at least one connector, each of the first and second beam-like springs extending substantially radially of the axis of rotation.

47. The device of claim 46 wherein the at least one connector is arcuate and extends at least partially around the axis of rotation.

48. The device of claim 46 wherein the movable member is a platform.

49. The device of claim 46 further comprising a micromotor carried by the substrate and coupled to the movable member for driving the movable member about the axis of rotation.

50. A micromechanical device comprising a substrate, a movable structure overlying the substrate for rotation about an axis of rotation, a stationary structure formed on the substrate, a connector overlying the substrate, a first flexure member coupling the connector to the stationary structure and a second flexure member coupling the movable structure to the connector, each of the first and second flexure members extending substantially radially from the center of rotation.

51. The device of claim 50 wherein the connector extends at least partially around the axis of rotation.

52. The device of claim 50 wherein the movable structure is fanlike in shape when viewed in plan.

53. The device of claim 50 further comprising a micromotor carried by the substrate and coupled to the movable member for driving the movable member about the axis of rotation.

54. A micromechanical device comprising a substantially planar substrate, a stationary structure mounted on the substrate, a movable structure overlying the substrate for rotation about an axis of rotation and not more that first and second flexure members extending substantially radially of the axis of rotation, each of the first and second flexure members having a first end portion coupled to the stationary structure at the axis of rotation and a second end portion coupled to the movable structure.

55. The device of claim 54 wherein the first and second flexure members extend substantially radially from the axis of rotation at an angle to each other.

56. The device of claim 54 further comprising a micromotor carried by the substrate and coupled to the movable member for driving the movable member about the axis of rotation.

57. The device of claim 56 wherein the micromotor is an electrostatic microactuator.

58. The device of claim 54 wherein the movable structure has the shape of a sector of a circle when viewed in plan.

\* \* \* \* \*